US006279719B1

(12) United States Patent
Israel

(10) Patent No.: US 6,279,719 B1
(45) Date of Patent: Aug. 28, 2001

(54) VENDING MACHINE FOR DISPENSING SINGLE COPIES OF PERIODICALS AND NEWSPAPERS

(76) Inventor: Benjamin Israel, 1076 Bell La., Maple Glen, PA (US) 19002

( * ) Notice: Subject to any disclaimer, the term of this patent is extended or adjusted under 35 U.S.C. 154(b) by 0 days.

(21) Appl. No.: 09/519,250

(22) Filed: Mar. 6, 2000

(51) Int. Cl.[7] .......................... G07F 11/00; B65G 59/00; A01C 9/00

(52) U.S. Cl. .......................... 194/248; 221/14; 221/103; 221/213

(58) Field of Search .......................... 221/14, 213, 232, 221/103; 194/248, 223, 217

(56) References Cited

U.S. PATENT DOCUMENTS

| | | | | |
|---|---|---|---|---|
| 1,886,694 | | 11/1932 | Kelly . | |
| 3,042,250 | | 7/1962 | Watlington | 221/41 |
| 3,114,475 | | 12/1963 | Etes | 221/103 |
| 3,708,087 | | 1/1973 | Schonthal | 221/110 |
| 3,768,695 | | 10/1973 | Pearson | 221/227 |
| 4,043,484 | * | 8/1977 | Vanjo | 221/213 |
| 4,067,477 | | 1/1978 | Chalabian | 221/1 |
| 4,140,242 | | 2/1979 | Muller et al. | 221/154 |
| 4,174,047 | | 11/1979 | Owens | 221/54 |
| 4,569,461 | | 2/1986 | Orr | 221/1 |
| 4,583,658 | | 4/1986 | Israel | 221/213 |
| 5,178,299 | | 1/1993 | Mundt | 221/232 |
| 5,205,437 | | 4/1993 | Elder et al. | 221/103 |
| 5,791,511 | * | 8/1998 | Lowing | 221/14 |
| 5,921,436 | | 7/1999 | Lowing | 221/279 |
| 5,954,227 | * | 9/1999 | Moore et al. | 221/103 |
| 5,996,840 | | 12/1999 | Serduke | 221/210 |

* cited by examiner

*Primary Examiner*—Kenneth R. Rice
*Assistant Examiner*—Bryan Jaketic
(74) *Attorney, Agent, or Firm*—Drinker Biddle & Reath LLP

(57) ABSTRACT

A vending machine for dispensing a single publication product at a time. The vending machine includes a housing with a front wall, back wall, side walls, top wall and bottom wall. A door is hinged to the front wall on the housing and forms part of a display case for displaying information regarding the product being dispensed. An elevator is located within the housing and slidable from a position near the back wall toward the front wall, the elevator adapted to contain a stack of products being dispensed. A dispensing assembly is mounted within housing and forward of the elevator. The dispensing assembly includes a dispensing sled which is translatable from an upper position to a lower position. The dispensing sled is adapted to engage a publication product located on the elevator and to slide the publication product toward a dispensing area located at the bottom of the housing. An actuation arm is attached to the dispensing sled and pivotally mounted to the housing. The actuation arm projects outward from the front of the housing and is actuatable in a downward direction. The downward actuation of the actuation arm translates the dispensing sled downward. A locking mechanism controls dispensing of a publication product.

28 Claims, 18 Drawing Sheets

VENDING MACHINE FOR DISPENSING SINGLE COPIES OF PERIODICALS AND NEWSPAPERS

FIELD OF THE INVENTION

The present invention is directed to a publication vending machine configured to dispense a single newspaper and/or magazine at a time.

BACKGROUND OF THE INVENTION

Single newspaper vending machines are known in the art. Exemplary embodiments of such machines are disclosed in U.S. Pat. No. 4,458,658 to Israel. U.S. Pat. No. 4,140,242 to Muller et al and U.S. Pat. No. 3,768,695 to Pearson. In the Muller et al patent, a front hinged door 34 is unlatched by a coin release mechanism to provide access to the newspapers. When the door is unlatched, a newspaper dispensing device 90 becomes visible. A spring-loaded magazine located behind the device 90 brings the stack of newspapers to the level of a withdrawal gate 96. When the door 34 is closed, lever 68 displaces a projection 84 so as to trip and release a lever 146. The lever 146 is part of a mechanism that otherwise blocks the withdrawal gate 96. An adjustment mechanism 94, shown in FIG. 5 of that patent, adjusts the height of a lower section 106 of the withdrawal gate, the upper section being part of the machine frame and being stationary. The lower section is provided with a pocket 112 for accommodating the user's hand. Withdrawal of a newspaper rotates separate shaft-mounted levers 116, 118 forwardly. The lever 116 is arrested in the forward position by a lever 126 which moves over and rests on a stop 130. The lever 118 then swings back to its original position, displacing a blocking lever 120 which is then spring-urged back to its original position so as to block the lever 118 from further forward displacement. When the hinged door 134 is closed, level 68 causes displacement of lever 146 and the lever 124 on which stop 130 is mounted thereby freeing lever 126 so that lever 116 can rotate back to vertical. A paddle on lever 116 displaces the blocking lever 120, freeing lever 118 for subsequent operation.

The Pearson patent discloses a top loading machine of the type described in the Muller et al. patent. A narrow front access door 14 is locked and unlocked by a coin mechanism. The door 14 is swung open to gain access to the newspapers. A newspaper is withdrawn through a space between upper and lower gate sections 19, 20. The lower gate section 20 is secured to a plate 25 which is vertically reciprocatable in channels 26, 27 by means of a suspension cable 21 wound around an adjustment shaft 22 mounted on the top gate section 19. Newspapers are bulk loaded on a stack carrier 18 which is supported by a cable system as shown in FIG. 3. The suspension system is responsive to opening and closing of the front access door. When the access door is open, a pawl 30 swings forward as a newspaper is withdrawn. After the newspaper is withdrawn, while the door is still open, the pawl 30 returns to its original position and a lever 51 engages and locks the shaft on which the pawl is mounted so as to lock the pawl in position and block withdrawal of the next newspaper. When the door is closed, a finger 14L rotates lever 51 so as to release the pawl shaft. In a second embodiment of the machine, shown in FIG. 7 of the patent, the access door 14 is removed. The dispensing mechanism in this embodiment comprises a fixed gate section 80 and an adjustable gate section 81. The mechanism includes a bail coupled to a shaft 83 journaled in the machine frame. A pawl 82 depends from the shaft and is locked in position after removal of the newspaper by a linkage assembly including a toggle 90 which is controlled by the coin mechanism.

The Israel patent discloses a single newspaper vending machine. The vending machine includes an elevator unit for raising newspapers after a newspaper is dispensed. A dispensing mechanism controls dispensing of one newspaper per payment. A coin mechanism controls actuation of the dispensing mechanism when a suitable amount of coins are inserted into the machine.

Vending machines wherein newspapers are dispensed by semi-automatic operation are also known. For example, in U.S. Pat. No. 3,042,250 (Watlington) there is disclosed a vending machine provided with a bridge 25 and a shaft 27 on which sharpened fingers 33 are located. See FIGS. 2 and 5. The bridge is displaceable by the operator using an actuator mechanism having a handle 41. During forward movement of the bridge the fingers engage the top newspaper in a stack and move it to a discharge slot. The stack platform coacts with vertical racks 16 and ratchet wheels 58. Similarly, U.S. Pat. No. 3,114,475 (Etes) discloses a vending machine capable of semi-automatic operation wherein a linger 36, which is mounted on a reciprocatable carriage impales the top paper in a stack and displaces the paper to a discharge slot.

Newspaper dispensing machines employing slidable dispensing mechanisms are also known, as disclosed for example in U.S. Pat. No. 1,886,694 (Kelly) and U.S. Pat. No. 3,708,087 (Schonthal). In the Kelly patent, an automatic dispensing operation is followed by manual withdrawal of the newspaper. A frame A is displaceable together with an operating head 42 (within which a coin control mechanism is located) with respect to a discharge slot 11. See FIG. 3. The frame is provided with rollers 34 which rotate when head 42 is retracted by the operator so as to feed a paper to slot 11. The paper is then grasped and withdrawn by the operator. Conversion of a semi-honior dispensing machine to a single copy machine is disclosed in U.S. Pat. No. 4,174,047 (Owens). A release mechanism 36 includes a slide plate 38 displaceable through a slot 29. The plate 38 is spring-coupled to a coin mechanism pushrod 23. A jaw 53 is mounted below the plate 38 to grip the forward edge of a paper. The mechanism 36 is pulled forward bringing a newspaper with it, and the paper is then grasped and withdrawn by the operator. A single paper vending machine wherein locking mechanisms are moved into and out of the newspaper path is also known as disclosed in U.S. Pat. No. 4,067,477 (Chalabian).

Although the single copy vending machines disclosed in the above reterences are improvements over the popular honor-type vending machines, a need exists for an improved single newspaper/magazine vending machine which is economically feasible to manufacture and which protects the dispensed product from damage from weather.

SUMMARY OF THE INVENTION

A vending machine is disclosed for dispensing a single publication product at a time. The vending machine includes a housing with a front wall, back wall, side walls, top wall and bottom wall. A door is hinged to the front wall on the housing and forms part of a display case for displaying information regarding the product being dispensed.

An elevator is located within the housing and slidable from a position near the back wall toward the front wall. The elevator is adapted to contain a stack of products being dispensed.

A dispensing assembly is mounted within housing and forward of the elevator. The dispensing assembly includes a dispensing sled which is translatable from an upper position to a lower position. The dispensing sled is adapted to engaged a publication product located on the elevator and to slide the publication product toward a dispensing area located at the bottom of the housing.

An actuation arm is attached to the dispensing sled and pivotally mounted to the housing. The actuation arm projects outward from the front of the housing and is actuatable in a downward direction. The downward actuation of the actuation arm translates the dispensing sled downward.

A locking mechanism controls dispensing of a publication product.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention there is shown in the drawings a form which is presently preferred, it being understood, however, that this invention is not limited to the precise arrangements shown.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Figure 1:
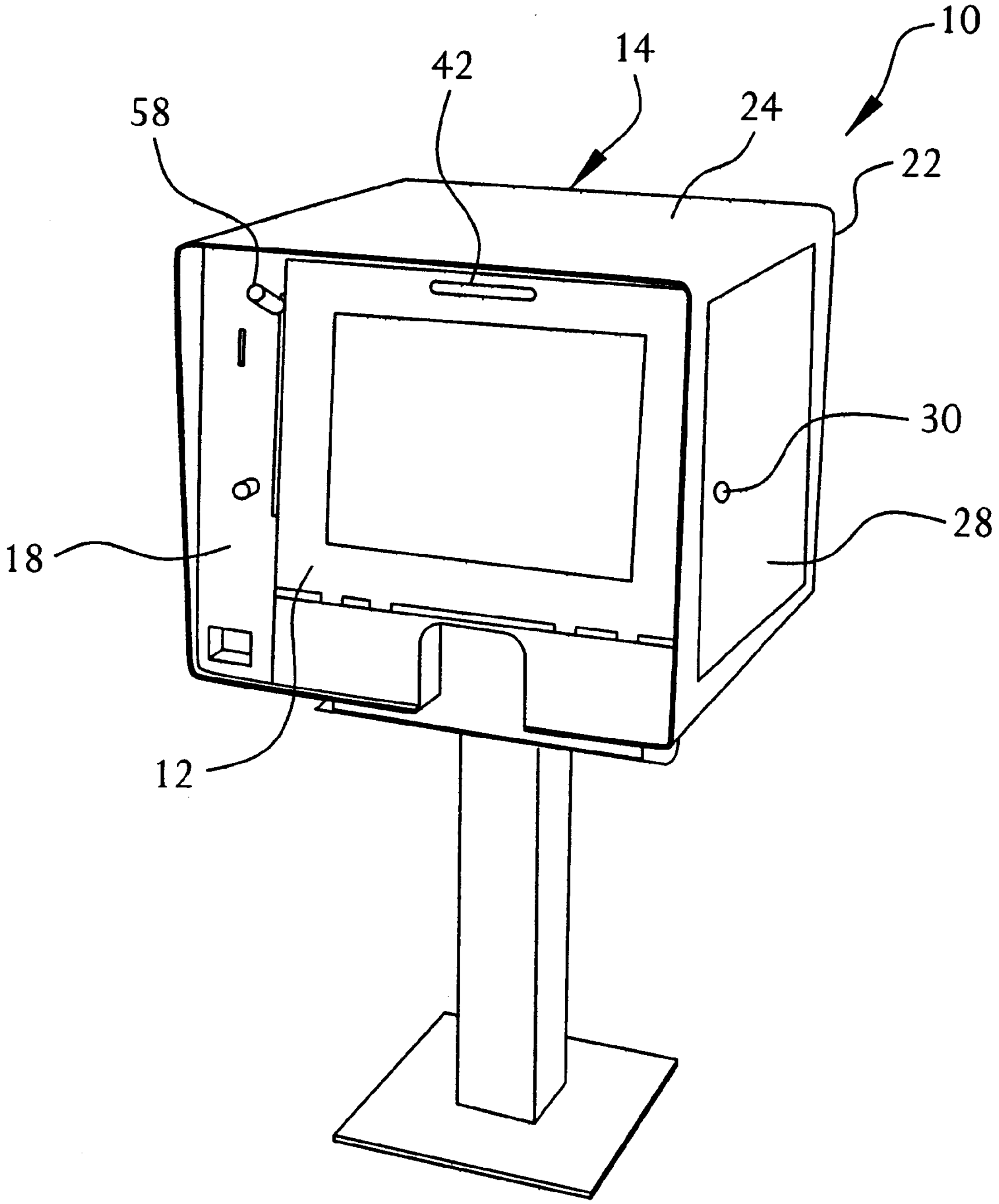
FIG. 1 is an isometric view of one embodiment of the present invention illustrating a single publication vending machine.

Referring to the drawings, wherein like numerals indicate like elements, there is shown in FIG. 1 a single paper vending machine according to the present invention designated generally as 10. FIG. 1 actually shows one vending machine on a stand. The vending machine 10 includes a front door 12 which is hingedly mounted to a housing 14 via hinges 16 (shown in FIG. 2). The housing 14 includes a front wall 18, a back wall 20 (shown in FIG. 2), two opposed side walls 22, a top wall 24 and a bottom wall 26 (shown in FIG. 2). The walls are attached to one another through any conventional means and are preferably attached so as to prevent water intiltration into the housing.

At least one of the side walls 22 includes a hinged service door 28 which permits access to the inside of the vending machine for loading and unloading articles to be dispensed and for accessing a coin mechanism. It is also contemplated that the entire side wall could operate as the service door. A lock 30 is preferably mounted to the service door to prevent access to the interior of the machine.

Figure 2:
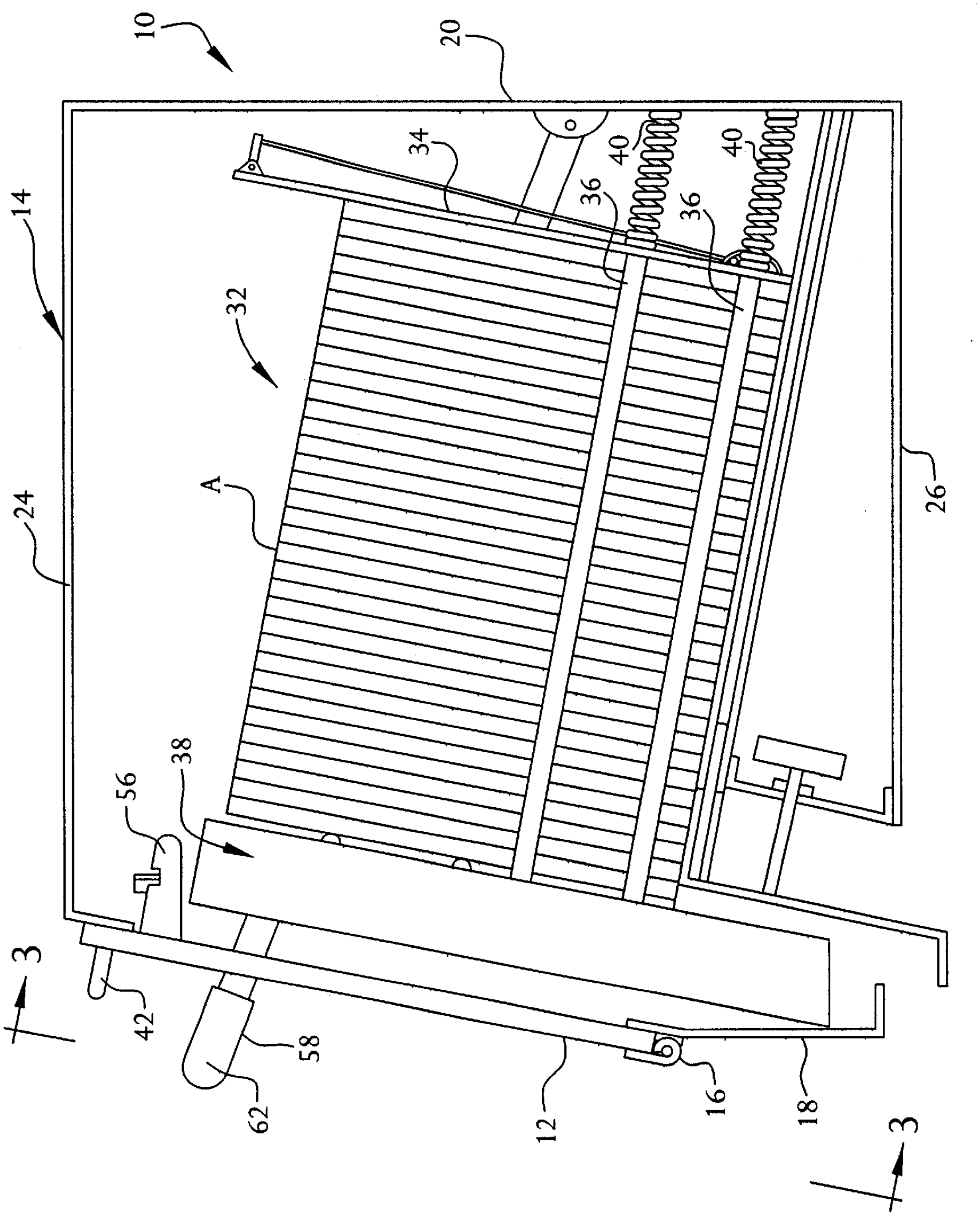
FIG. 2 is a cross-sectional view of the right side of the vending machine according to the present invention.

Referring now to FIG. 2, a side cross-sectional view of the vending machine 10 is shown. The vending machine 10 includes an elevator 32 which is mounted with the housing 14 and is translatable from a position near the back wall 20 of the housing toward the front door 12. The elevator 32 includes a base 34 which is slidably mounted on one or more guide shafts 36. Two guide shafts 36 are shown in FIG. 2, one positioned vertically above the other. The guide shafts 36 are attached to the back wall 20 of the housing 14 and extend forward to a dispensing assembly 38. The base 34 includes holes near its sides through which the guide shafts 36 pass. The guide shafts 36 operate to guide the base 34 from a position near the back wall 20 forward toward the dispensing, assembly 38. The elevator 32 is shown loaded with articles for dispensing (generally designated "A") such as periodicals or newspapers.

A biasing member 40, such as a spring, is located on each guide shaft 36 between the base 34 and the back wall 20. The biasing member 40 is sized larger than the hole in the base 34, thus resulting in the biasing member 40 being retained between the base 34 and the back wall 20. The biasing member 40 biases the base 34 toward the dispensing assembly 38 and away from the back wall 20. The biasing members 40 are chosen so that the initial compression on each spring when the elevator is unloaded (i.e., when the base 34 is empty and is in its position closest to the dispensing assembly 38), provides a desired residual force toward the dispensing assembly 38. When the elevator 32 is loaded, the weight of the articles cause the biasing members 40 to compress forcing the base 34 toward the back wall 20. The biasing members 40 provide the requisite amount of contact between the articles A and the dispensing mechanism 38.

Figure 3:
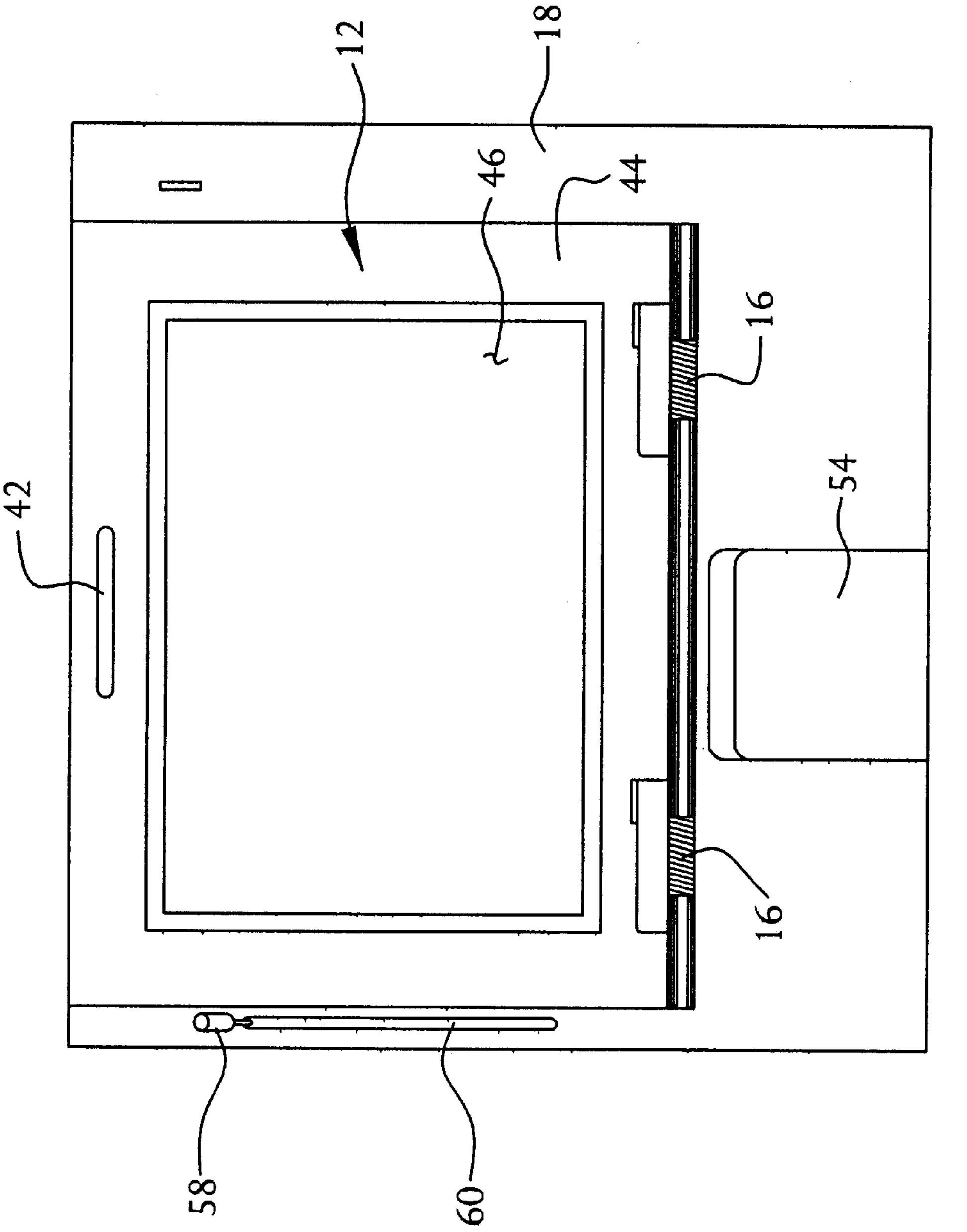
FIG. 3 is a front view of the vending machine according to the present invention taken along lines 3–3 in FIG. 2.

As shown in FIGS. 2 and 3, the front door 12 is hinged to the front wall 18 via a spring 16. The spring 16 is preferably a torsion spring which biases the front door 12 toward the front wall 18. The front door 12 includes a handle 42 to facilitate opening and closing of the door 12. The front door 12 also includes a frame 44 within which a transparent panel 46 is mounted. The transparent panel 46 can be made from glass, plastic or any other suitable transparent material, and is mounted to the frame 44 in any conventional manner.

Figure 4A:
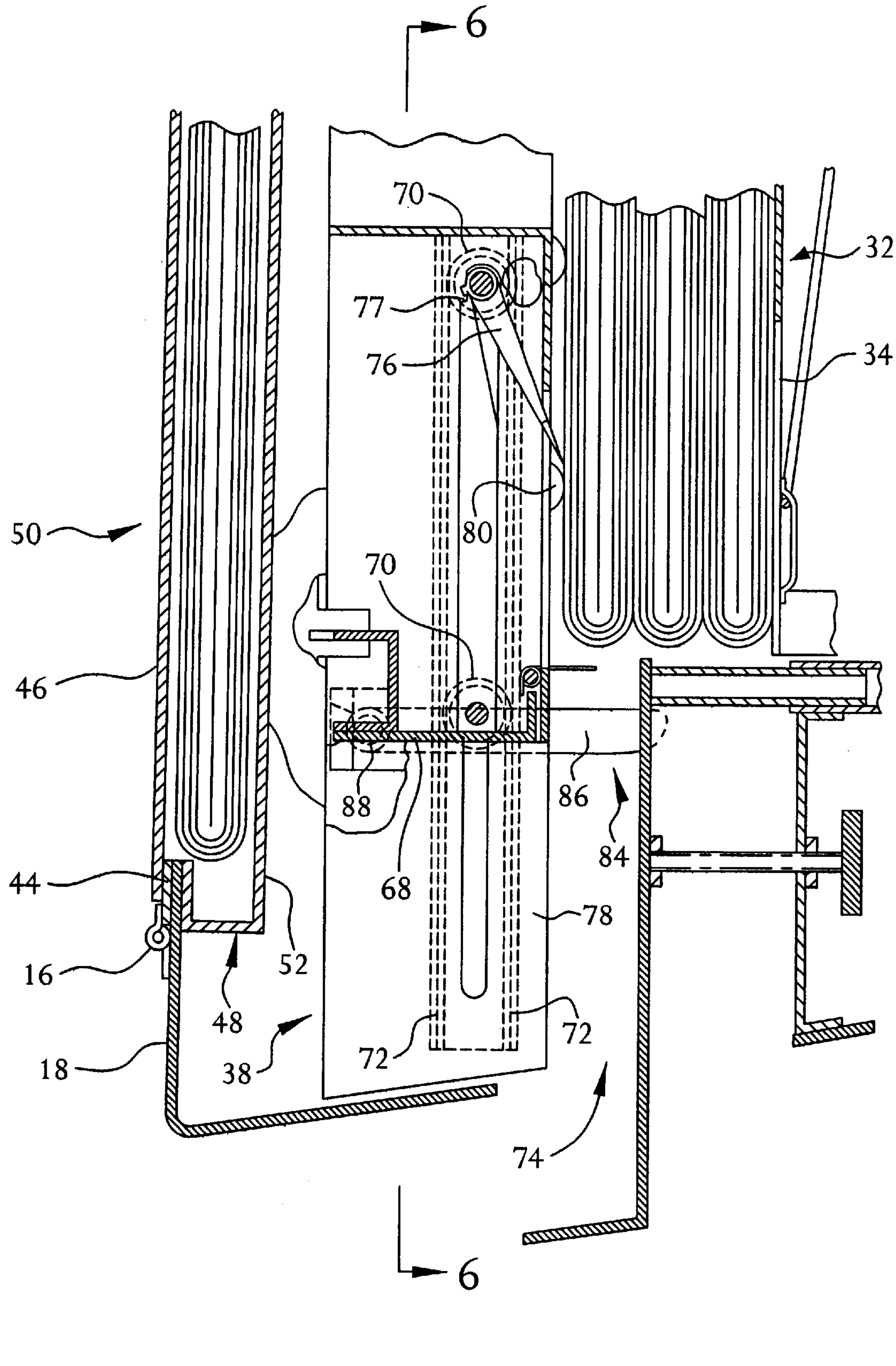
FIGS. 4A–4C are enlarged partial cross-section views of the vending machine illustrating the operation of the dispensing assembly.

As shown in FIG. 4A, a display frame 48 is attached to the inside of the front wall 18 and defines, in combination with the transparent panel 46 and the frame 44, a display case 50 for retaining one or more articles which are being dispensed by the machine. The display frame 48 includes a rear wall 52 which is visible through the transparent panel when no article is contained within the display case 50. The forward face of the rear wall 52 may include indicia for displaying a suitable message, such as the phrase "Sold Out", when there are no longer any articles left to be dispensed.

As shown in FIG. 3, a recessed opening, 54 is formed in the bottom of the front door 12 and is designed to facilitate grasping of a dispensed article.

Referring again to FIG. 2, at least one rearwardly extending door latch 56 is attached to the back of the front door frame 44 and operates to lock the front door 12 to the housing 14 until all the articles A stored on the elevator 32 have been removed. The details of the door latch 56 and associated locking mechanism will de discussed below.

Figure 5A:
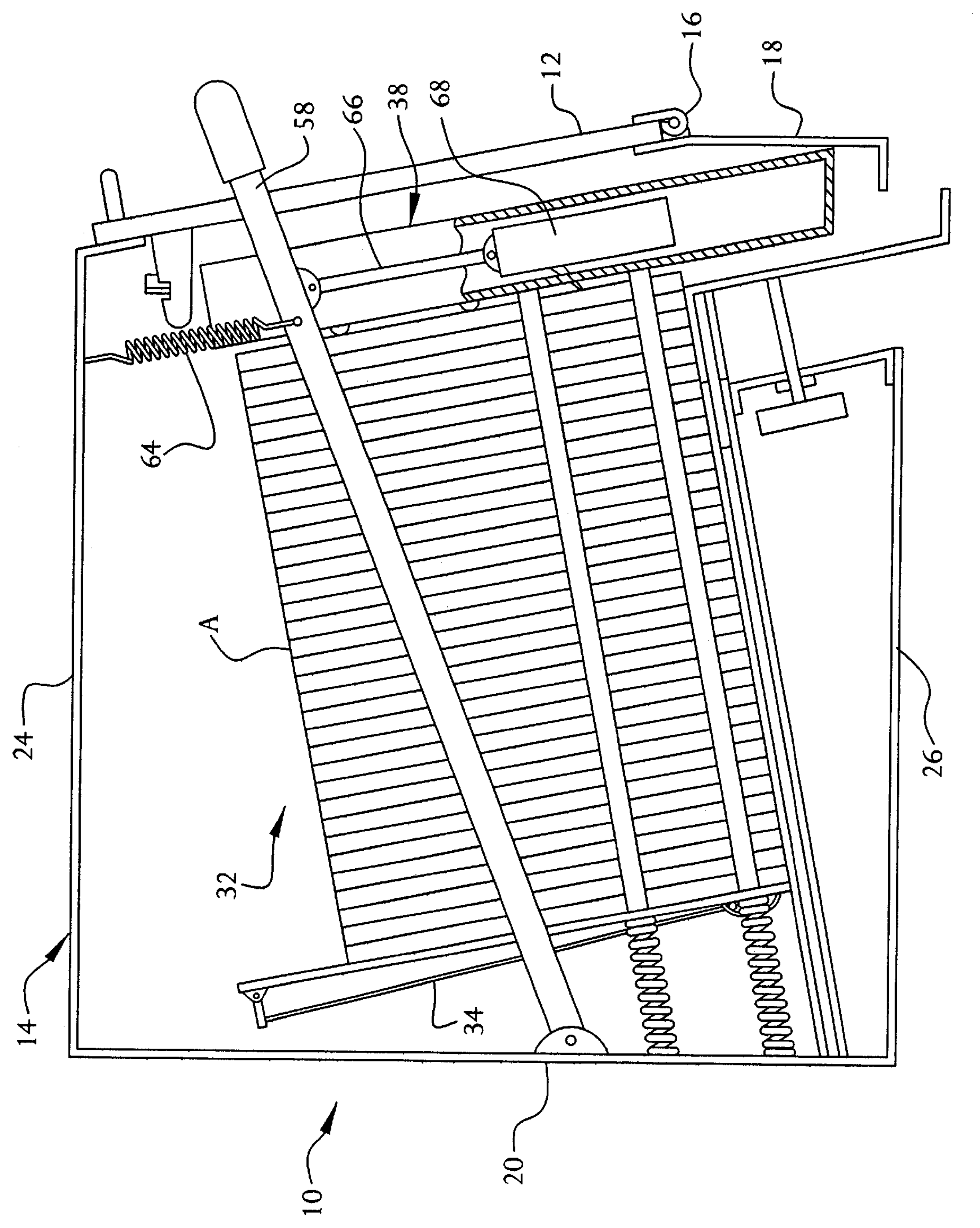
FIGS. 5A–5B are a cross-sectional views of the left side of the vending machine illustrating the operation of the actuation arm and dispensing assembly.
Figure 5B:
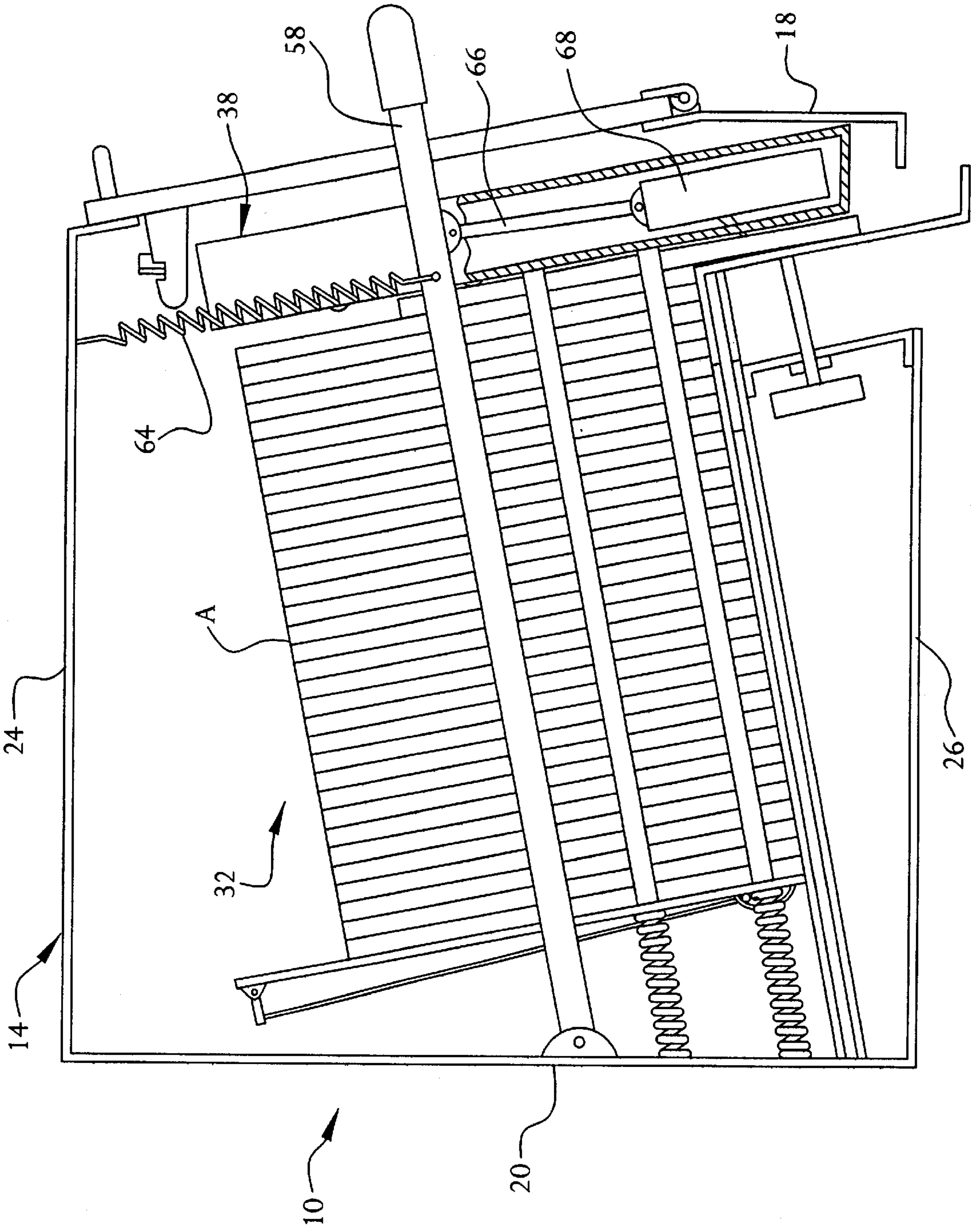

An actuation arm 58 is pivotably mounted to the back wall 20 of the housing 14 and extends through a slot 60 formed in the front wall 18, preferably adjacent to the front door 12. The actuation arm 58 preferably includes a hand grip 62 to facilitate grasping of the arm 58. As will be discussed in more detail hereinafter, the actuation arm 58 controls dispensing of articles A from the machine 10. The actuation arm 58 is adapted to be pivoted by an operator of the machine through a small arc from an upper initial position (shown in FIG. 5A which is a right side view of the machine) to a lower dispensing position (shown FIG. 5B). One or more springs 64 are attached to the actuation arm 58 and the housing and are adapted to bias the arm 58 into its initial position (FIG. 5A).

The actuation arm 58 is attached to the dispensing assembly 38. More particularly, a linkage 66 is attached to the actuation arm 58 and to a dispensing sled 68. The dispensing sled 68 is translatably mounted to the dispensing assembly 38. The linkage 66 is designed to convert the arcuate motion of the actuation arm 58 into translation of the dispensing sled 68. The translation of the dispensing sled 68 feeds the article located on the top of the elevator 32.

Figure 4B:
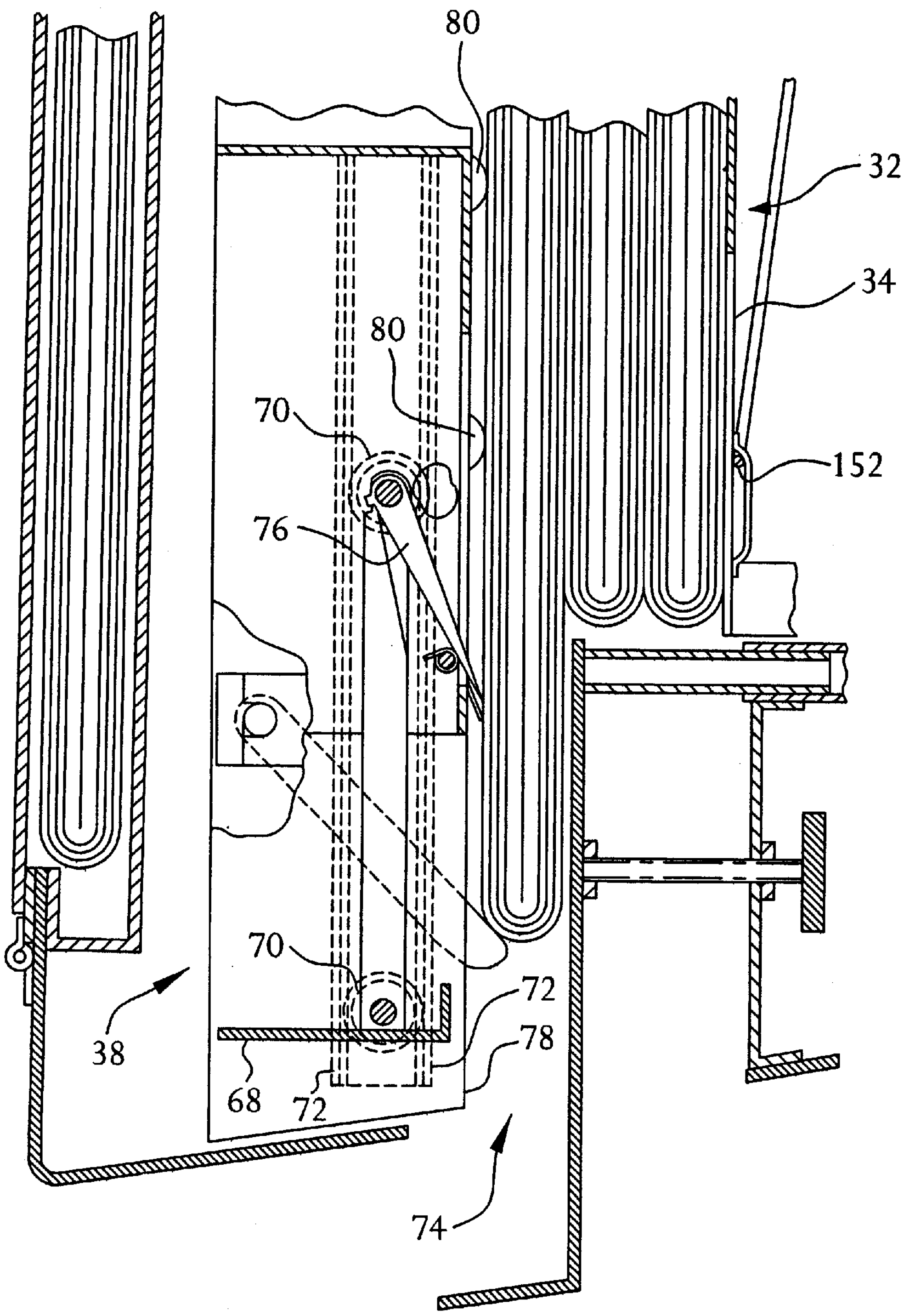
Figure 4C:
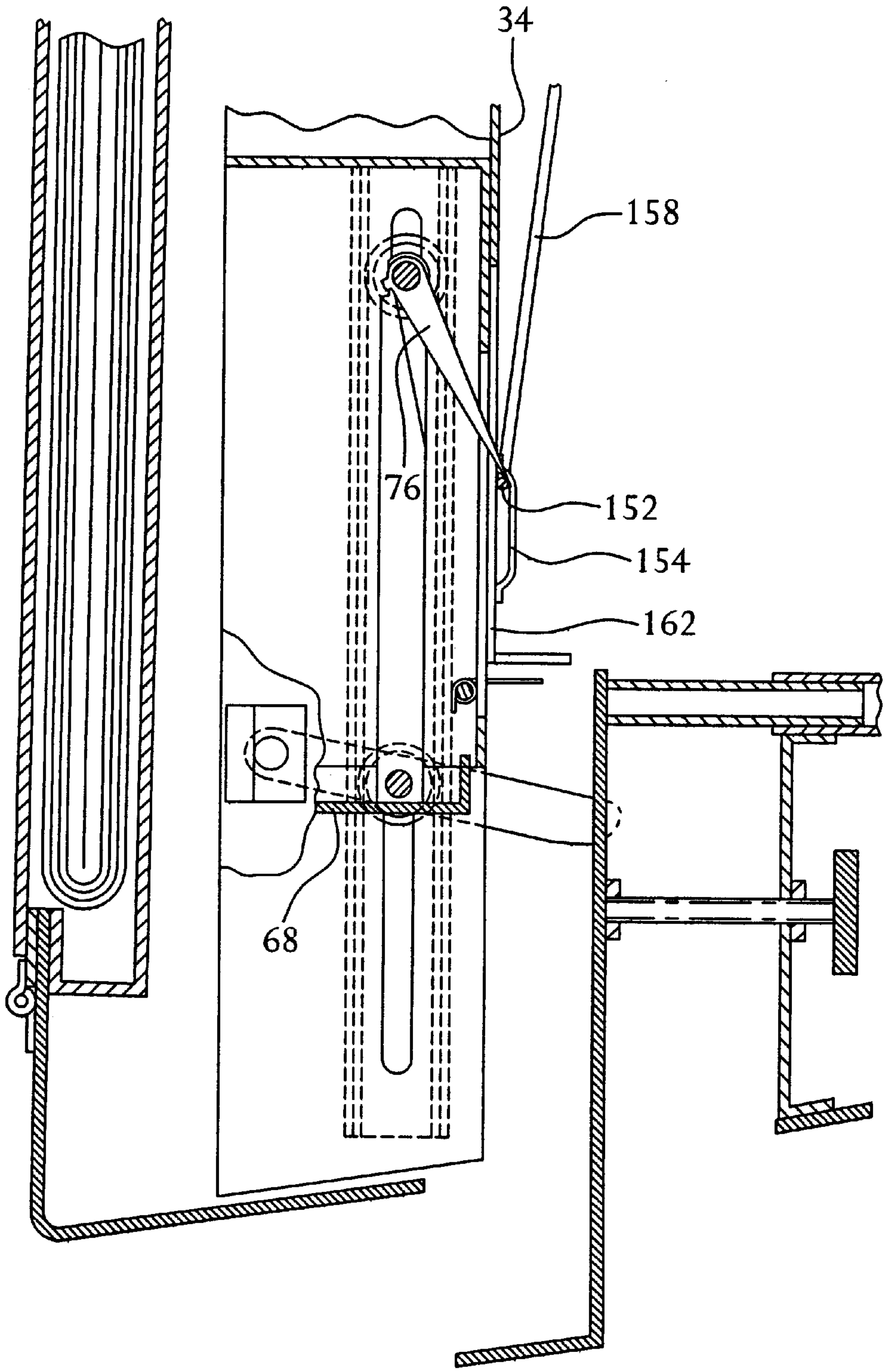

Referring to FIGS. 4A through 4C, details of the operation of the dispensing sled 68 and the structure of the dispensing assembly 38 are shown. In the illustrated embodiment of the invention in FIG. 4A, the dispensing sled 68 includes two guide wheels (shown in phantom and identified by the numeral 70) mounted on either side of the sled 68. The guide wheels 70 are located within rails 72 that extend from an upper end of the dispensing assembly 38 to a lower discharge end 74 located in the recessed opening. The rails 72 (guide the sled 68 from an upper, initial position (FIG. 4A) to a lower dispensing position (FIG. 4B) at the discharge end 74 of the dispensing assembly 38. The rails 72 are mounted to a fixed support 78.

The dispensing sled 68 also includes one or more contact fingers 76 which are attached to the sled 68. The fingers 76 extend rearward and downward as shown. The fingers 76 are spring biased into the position shown in FIG. 4A by a torsion spring (not shown). A stop 77 limits the backward swinging of the finger. The details of the construction and operation of the fingers 76 can be found in U.S. Pat. No. 4,458,658, which is incorporated herein in its entirety. The fingers 76 have sharp ends or tips and are designed and oriented to engage the forward facing surface of the top article on the elevator 32.

A fixed support 78 is attached to the housing 14 and has rollers 80 rotatably mounted within idler bearings. The rollers 80 protrude through the back of the fixed support and are designed to contact the top article on the elevator 32. The rollers 80 roll along the surface of the top article while it is being dispensed. thereby easing the sliding of the top article out of the machine.

Figure 6:
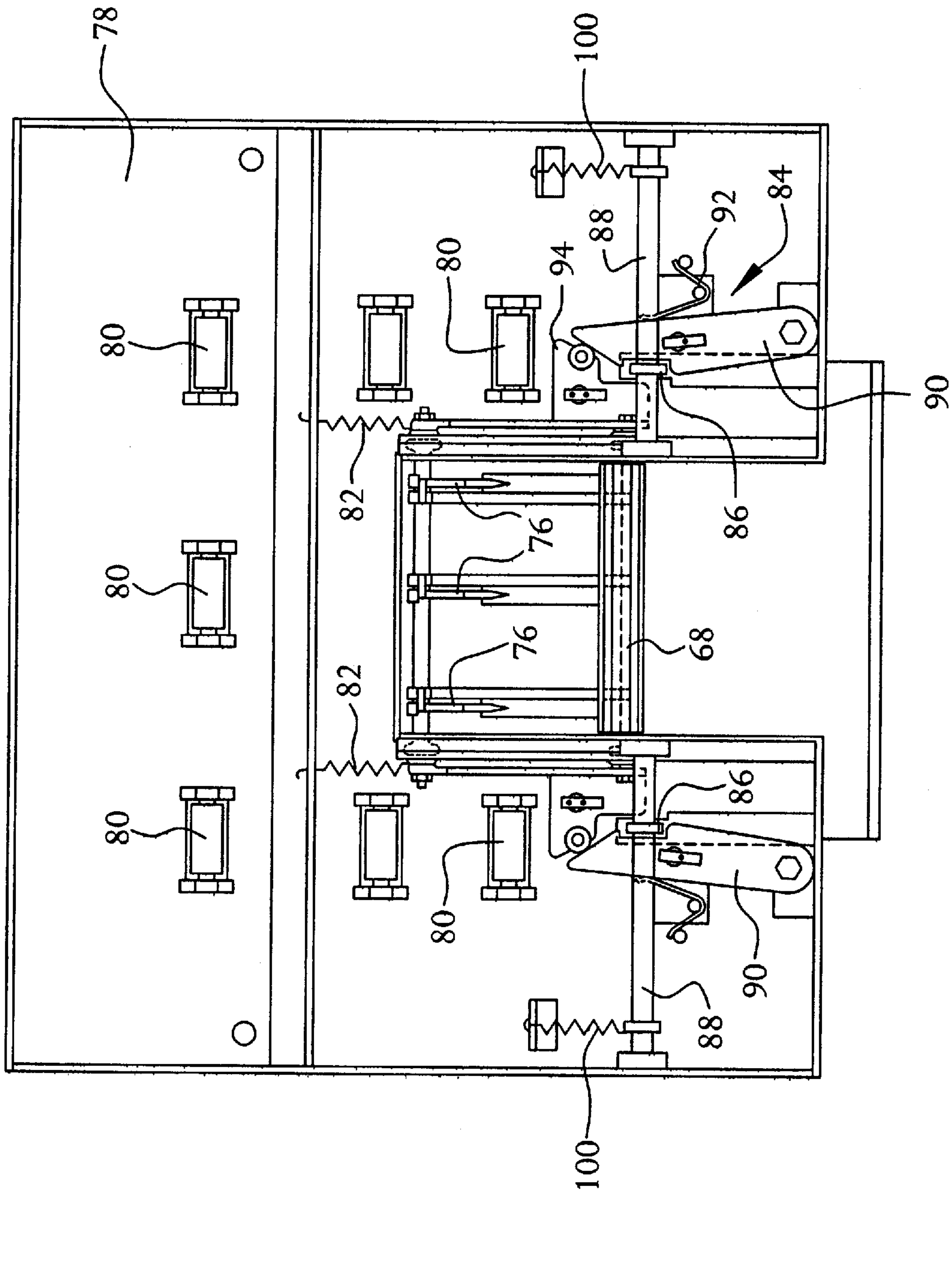
FIG. 6 is a top view of the dispensing assembly.

FIG. 6 is a plan view of the dispensing assembly 38 taken along lines 6—6 in FIG. 4A, and shows the details of the fixed support 78. The dispensing sled 68 is attached to the fixed support 78 through one or more springs 82. The springs 82 bias the dispensing sled 68 into its uppermost or initial position (FIG. 4A). When the actuator arm 58 is in its lowermost position (FIG. 5B), the linkage 66 translates the dispensing sled 68 to its dispensing position (FIG. 4B), thus, extending the springs 82. When the actuation arm 58 is released, the extended springs (both springs 64 and springs 82) force the arm and sled into their respective uppermost positions.

In order to prevent an article from slipping out of the machine prior to being dispensed, the present invention incorporates a blocking mechanism 84 shown in FIGS. 4A and 6. The blocking mechanism 84 includes at least one blocking lever 86 which is mounted to a shaft 88. The shaft 88 is rotatably mounted within journals. More preferably, there is a blocking lever 86 mounted on either side of the dispensing sled 68. Each blocking lever 86 extends through a slot formed in the support 78. The blocking lever 86 and shaft 88 are prevented from rotating by a latch 90 which is also pivotally mounted to the support 78. The latch 90 includes a recess which is designed to capture the blocking lever 86 to prevent it from pivoting. The latch 90 is biased toward the blocking lever by a torsion spring 92.

When the blocking lever 86 is in its blocked or locked position (i.e., facing backward as shown in FIG. 4A), the articles cannot pass downward into the dispensing area. Rotation of the blocking lever 86 downward from its blocked position is prevented by the latch 90.

Figure 7:
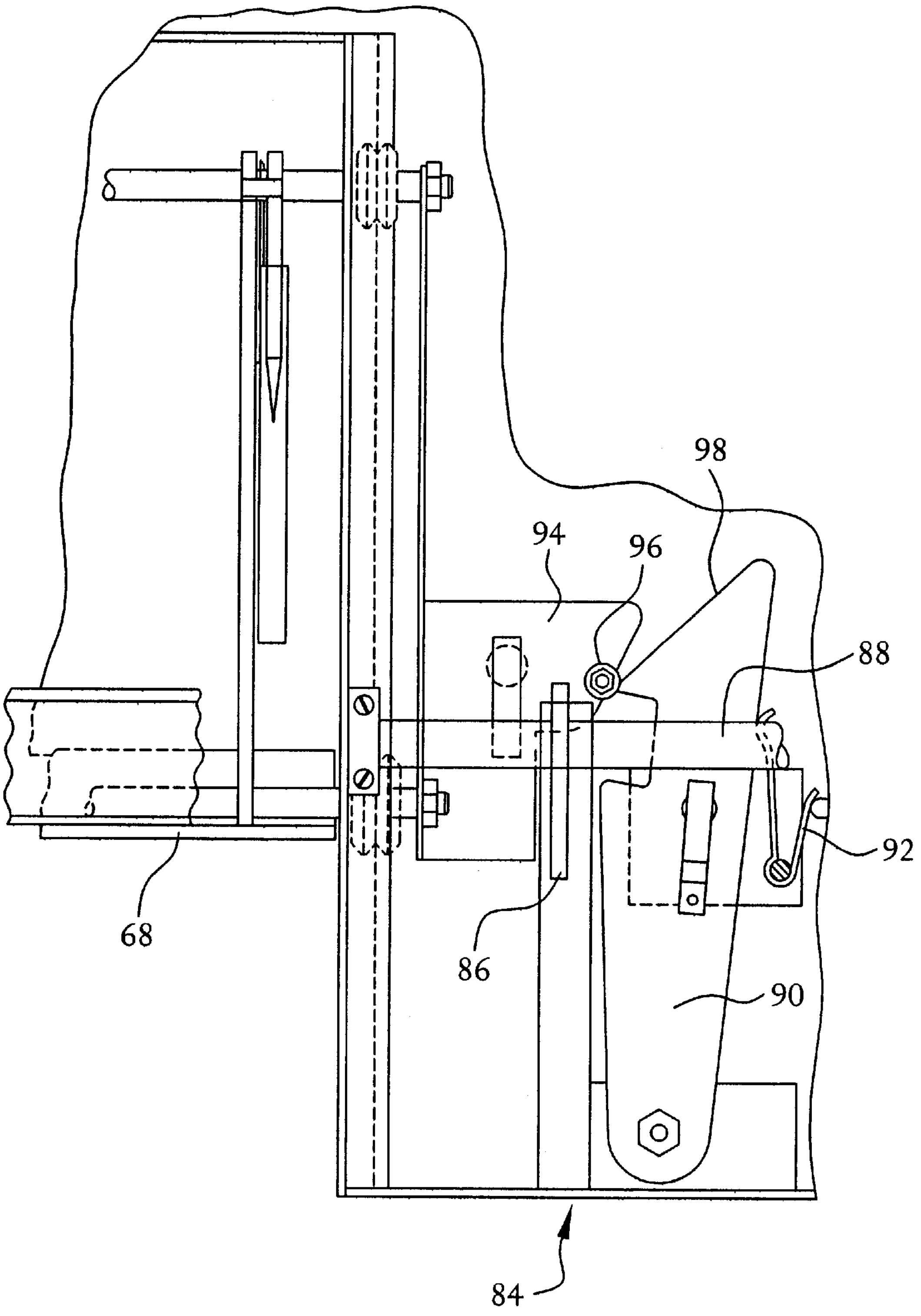
FIG. 7 is an enlarged view of the blocking mechanism for preventing dispensing of articles.

Attached to the dispensing sled 68 is a bracket 94. As shown in FIG. 7, the bracket 94 includes a roller 96 which is mounted on a lateral edge. When an article is being dispensed, the dispensing sled 68 begins to slide downward. As the dispensing sled 68 moves downward, it translated the bracket 94 in the same direction. As the bracket 94 moves, the roller 96 contacts a cam surface 98 on the latch 90. The movement of the roller 96 causes the latch 90 to pivot away from the blocking lever 86 and, at the same time, compresses the torsion spring 92. When the latch 90 pivots far enough, the blocking lever 86 is released from the recess. Further translation of the dispensing sled 68 cause the bracket 94 to contact the blocking lever 86, causing the blocking lever 86 and shaft 88 to rotate within the bearings, thus unblocking the dispensing area. A spring 100 is attached to the shaft 88 for biasing the shaft 88 back to its non-rotated position. Thus, when the dispensing sled 68 is translated back to its original position, the spring 100 causes the shaft 88 to rotate back, thereby moving the blocking lever 86 back into its blocking position. At the same time, the torsion spring 92 causes the latch 90 to pivot back to its original position, locking the blocking lever 86 in the blocked position.

Figure 9A:
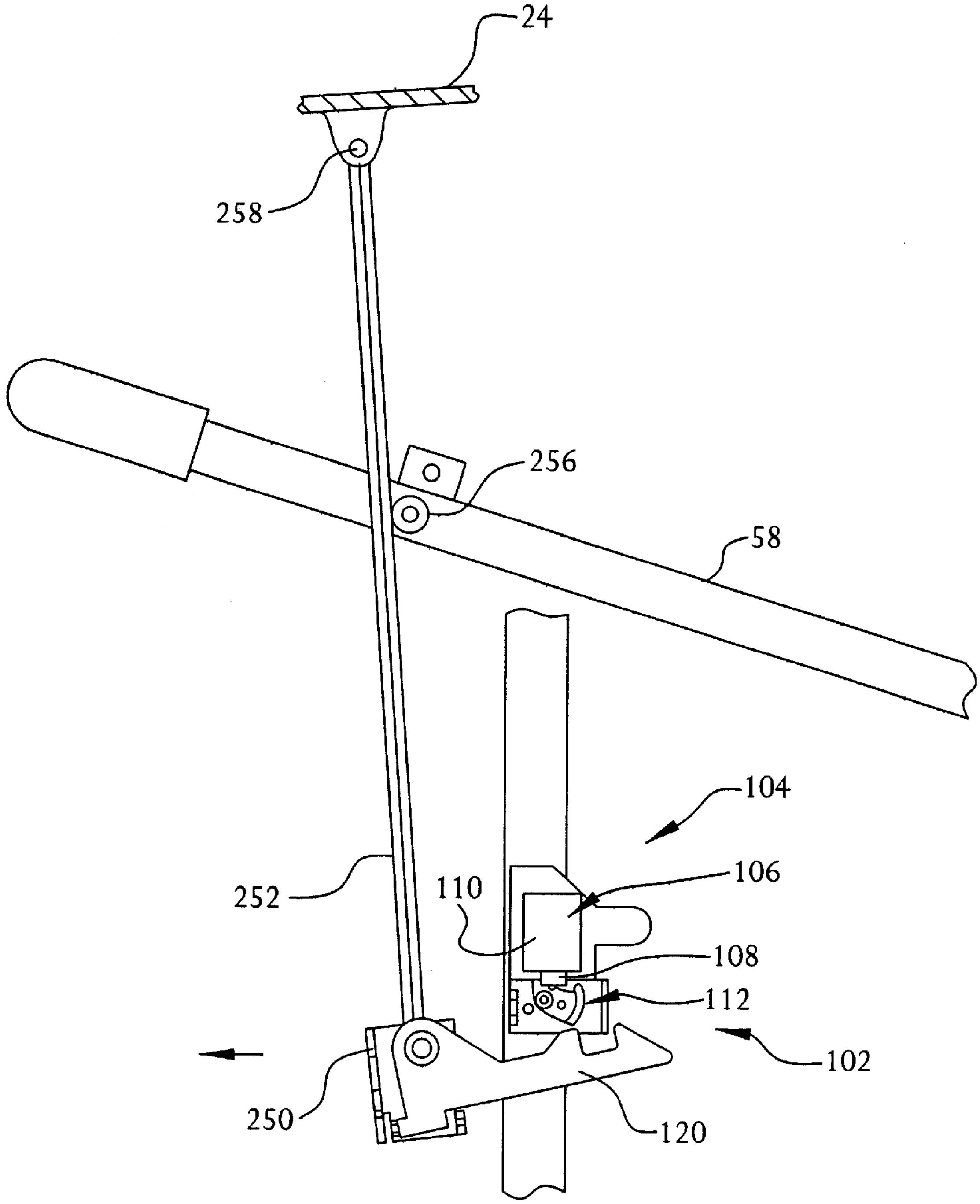
FIGS. 9A–9D illustrate the operation and features of a locking mechanism for locking the actuation arm until sufficient payment is received by a coin mechanism.

Referring now to FIG. 9A, an actuation arm locking mechanism 102 is shown. The arm locking mechanism 102 is configured to prevent actuation of the arm 58 until the requisite amount of money has been deposited in the machine 10. The locking mechanism 102 includes a coin mechanism 104 mounted within the housing 14. The coin mechanism preferably includes a battery operated solenoid 106. Coin mechanisms arc well known in the art and, therefore, only the specifics of the coin mechanism 104 as it relates to the present invention will be discussed. The solenoid 106 includes a plunger 108 which extends out of a solenoid housing 110. An internal spring (not shown) biases the plunger 108 into its extended position. The solenoid 106 is operative for retracting the plunger 108 upon receiving a requisite amount of coins.

Figure 9B:
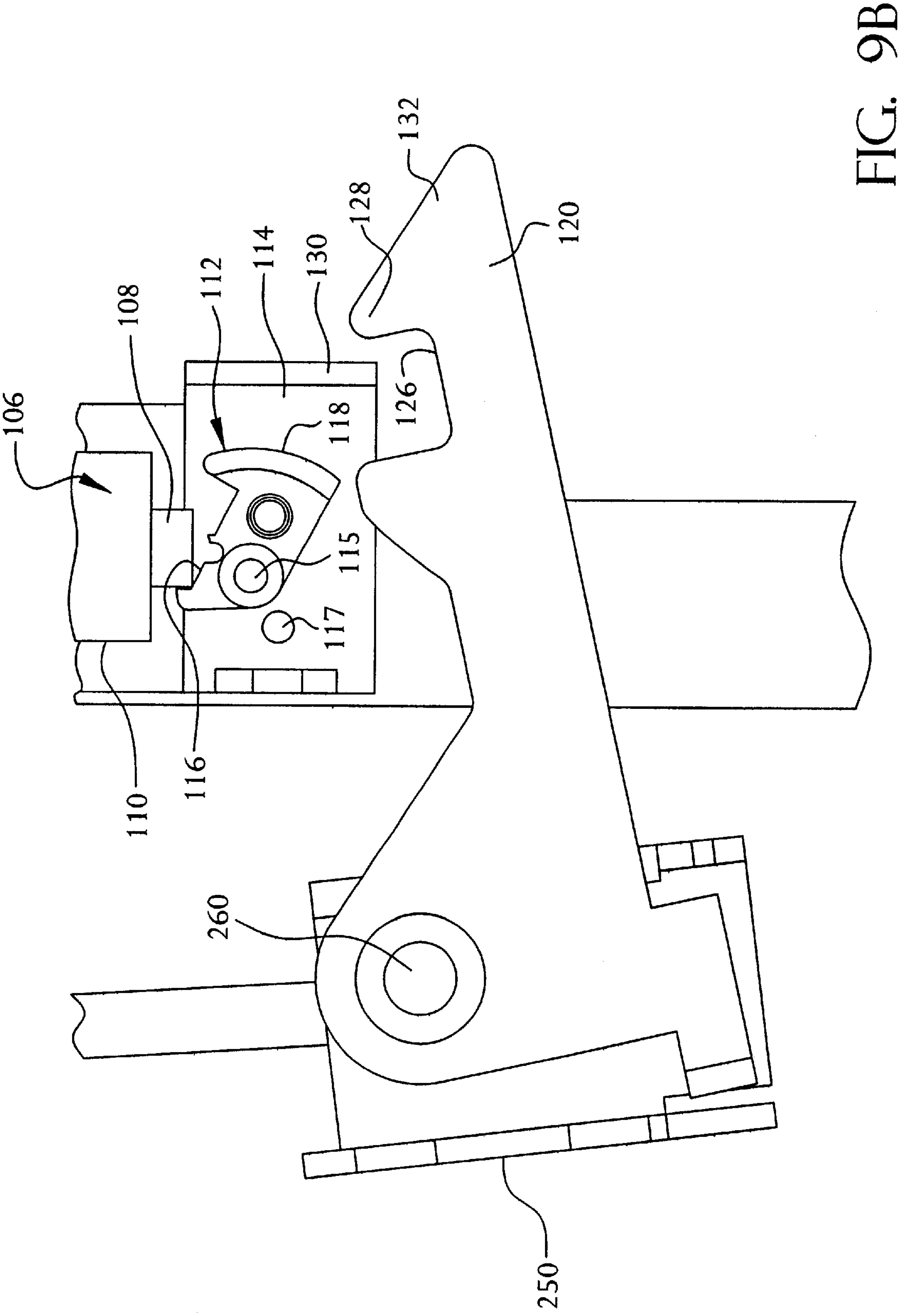

FIG. 9B is an enlargement of a portion of the coin mechanism 104 and locking mechanism 102. A trip lever or cam lock 112 is rotatably mounted to a locking bracket 114 below the solenoid 106. The earn lock 112 includes a locking seat 116 and a cam surface 118. The solenoid 106 is positioned such that the plunger 108 seats within the locking seat 116 when the plunger 108 is extended as shown.

A locking latch 120 is attached to the housing 14 and engaged with the actuation arm 58. More particularly, the locking latch 120 is pivotally attached to latch bracket 250. The latch bracket 250 is attached to a support rod 252 which is pivotally attached to the top wall 24 of the housing 14. A spring 254 is attached to the locking latch 120 and a flange on the latch bracket 120. The spring urges the latch 120 to pivot upwards (counter-clockwise) as shown in the figures. A contact pin 256 is formed on the actuation arm 58 and is located so as to contact the support arm 252 as shown in FIG. 9A. The rotation of the actuation arm 58 urges the support rod 252 to pivot about its pivot point 258 and, thus, translate the locking latch 120 in the direction of the arrow. As shown, the locking latch 120 includes a detent 126 and a lip 128.

FIG. 9B shows the location of the locking latch 120 when it is in its locked position. As shown, a flange 130 on the locking bracket 114 is located within the detent 126 of the locking latch 120. As such, lateral movement of the locking latch 120 is inhibited by the contact between the lip 128 and the flange 130 on the locking bracket 114. Since the locking latch 120 is engaged with the actuation arm 58, arcuate motion of the arm is inhibited and, therefore, the dispensing assembly 38 cannot be actuated.

Figure 9C:
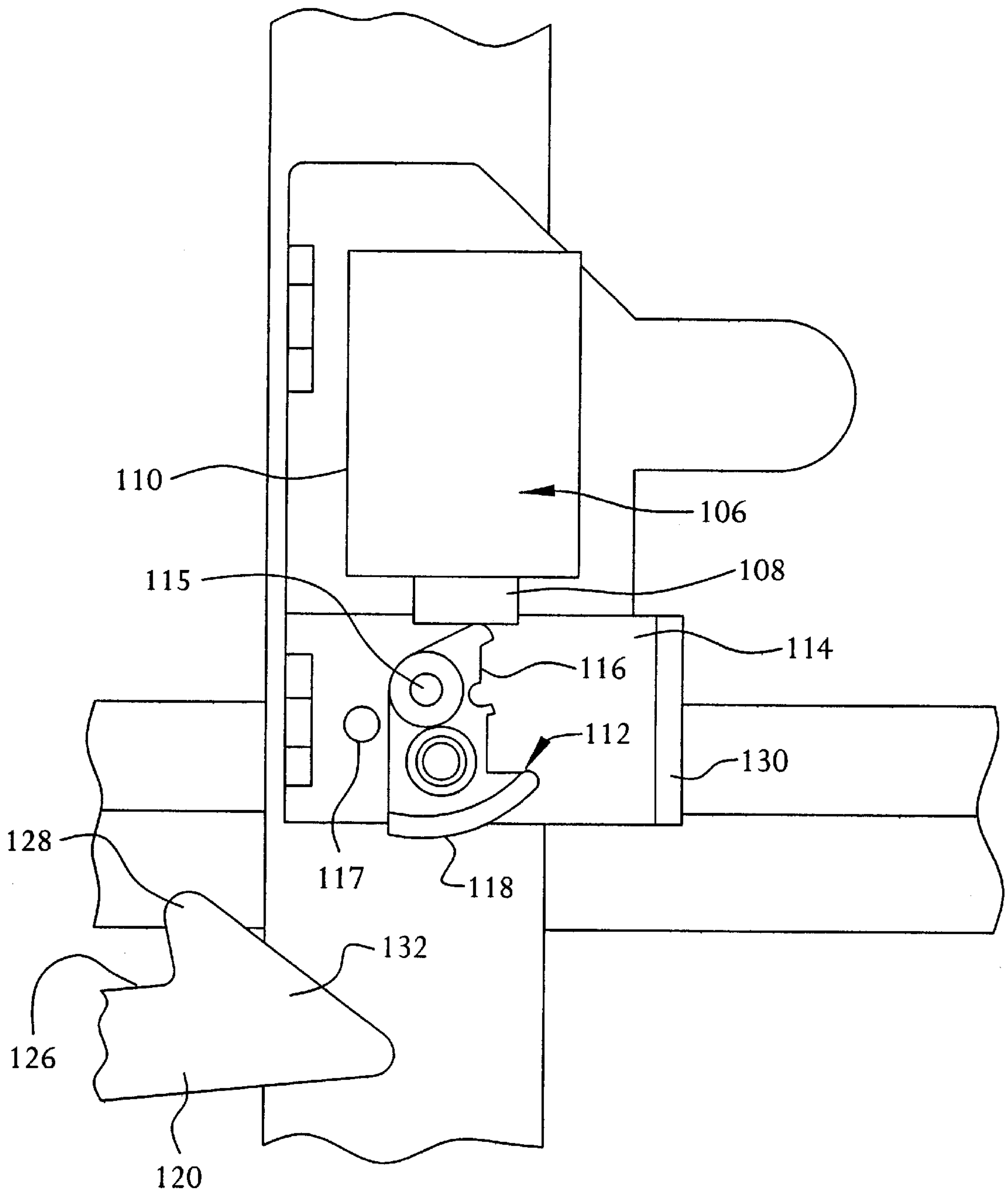
Figure 9D:
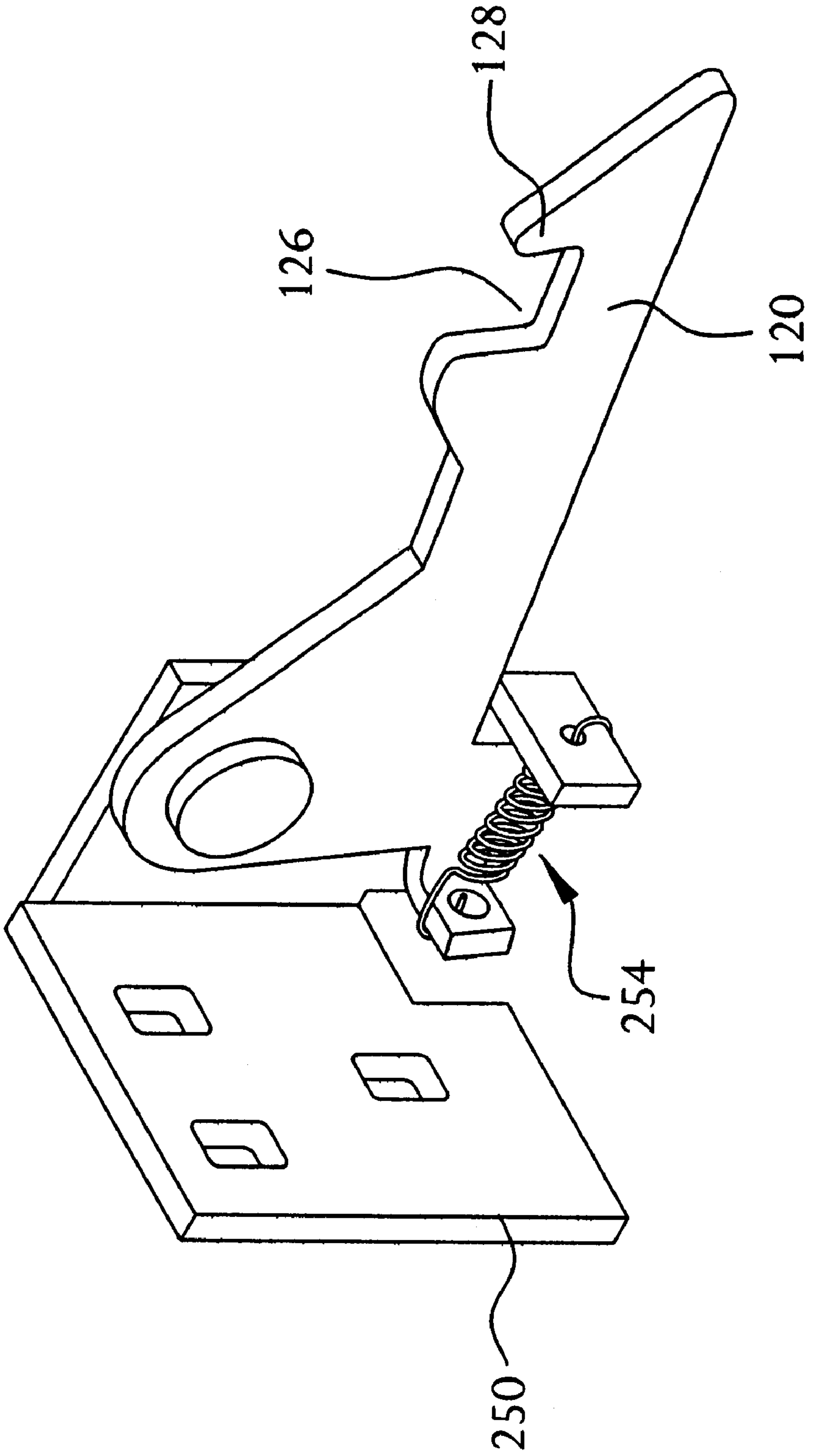

FIG. 9C illustrates the arm locking mechanism in the unlocked position. When a predetermined amount of coins are deposited in the coin mechanism 104, the solenoid 106 is actuated, retracting the plunger 108. Once the plunger 108 is retracted from the locking seat 116 on the cam lock 112, the asymmetry of the cam lock 112 causes it to pivot about its pivot point 115. As the cam lock swings clockwise about the pivot 115, the cam surface 118 on the cam lock 112 contacts the locking latch 120 and the cam lock hits the stop 117. At this point, lateral motion of the latch 120 will cause the latch 120 to hit the cam surface 118 and force it against the stop 117. Since the cam lock 112 cannot pivot any further, the locking latch 120 is forced to pivot about its pivot point 260 on the latch bracket 250. This results in the detent 126 moving down from the locking bracket 114 such that the lip 128 no longer engages with the flange 130. In this unlocked position, the locking latch 120 is free to translate laterally. Consequently, the actuation arm 58 is no longer locked and is, therefore, free to rotate.

After an article is dispensed, the actuation arm 58 is spring biased back to its upper position. This causes the locking latch 120 to translate back toward the locking bracket 114. As the tip end 132 of the locking latch 120 contacts the cam surface 118, it forces the cam lock 112 to counter-rotate. As the cam lock 112 rotates counterclockwise, it compresses the plunger 108 until it springs back into the locking seat 116. Further lateral movement of the locking latch 120 causes the tip end 132 to contact the flange 130. This contact causes the locking latch 120 to rotate just enough to allow the flange 130 to fall within the detent 126 once again locking the actuation arm 58.

Figure 10:
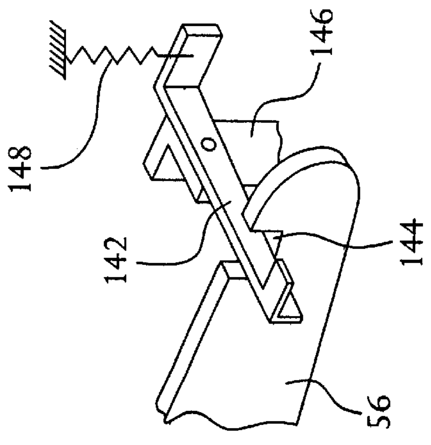
FIG. 10 is an isometric view of a portion of the door locking assembly.
Figure 12:
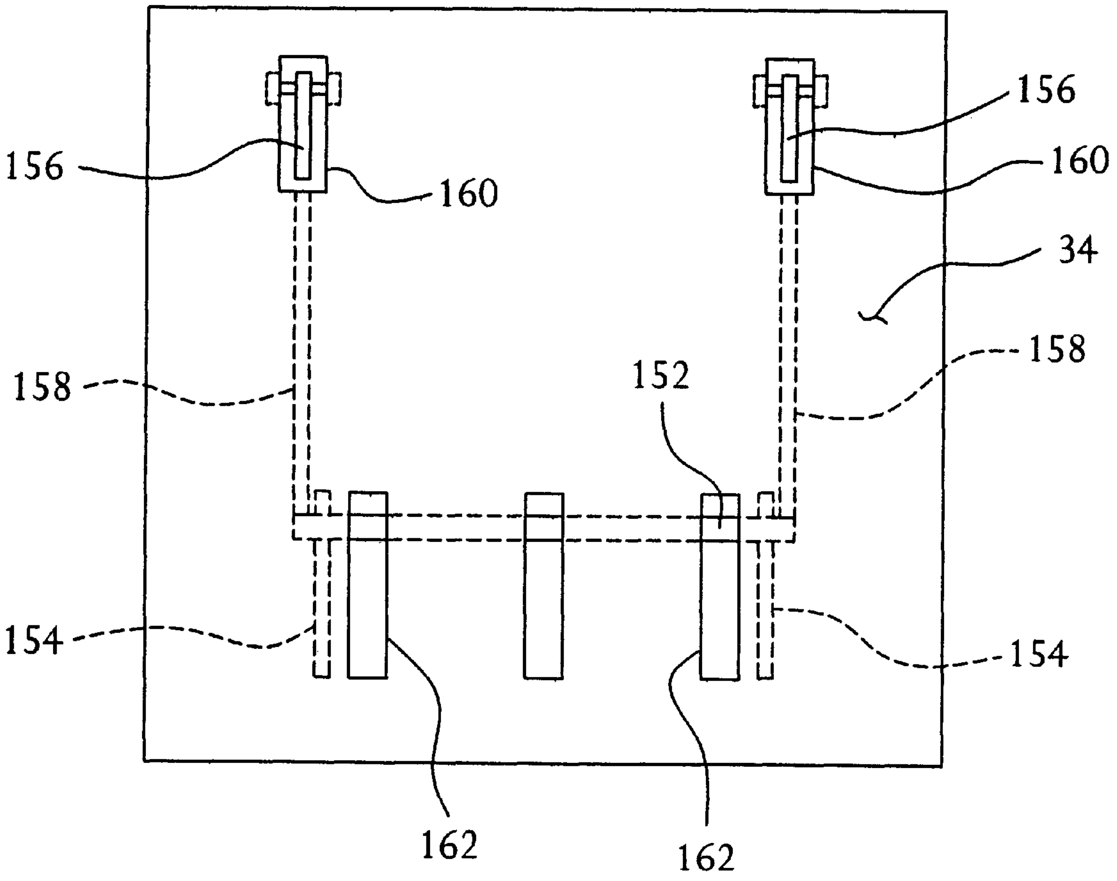
FIG. 12 is a plan view of the top of the elevator base.

As discussed above, the front door 12 has one or more door latches 56 that operate to lock the front door 12 to the housing 14. More particularly, the door latches 56 are part of a door locking assembly 140 shown in FIGS. 2, 4C, 10, 11A, 11B and 12. In addition to the door latches 56, the assembly 140 includes a door lock pivot arm 142 which engages with a detent 144 formed in the door latch 56 (see, FIG. 10). The arm 142 is pivotally mounted to a support bracket 146 which, in turn, is mounted to the housing 14. A spring 148 biases the door lock pivot arm 142 into engagement with the detent 144 in the door latch 56.

Referring now to FIGS. 4C, 11A, 11B and 12, the door locking assembly 140 also includes a disengagement mechanism 150. The disengagement mechanism 150 includes a rod 152 which extends across a portion of the rear surface of the base 34. The rod 152 is preferably retained within one or more cages 154 that are mounted to the rear surface of the base 34 and which permit limited downward motion of the rod 152. One or more slots 162 are formed in the base 34 adjacent to the rod 152. The slots 162 are located in alignment with the fingers 76 on the sled 68 such that the fingers 76 extend through the slots 162 when there are no articles on the base 34. The number of slots preferably corresponds to the number of fingers 76.

The rod 152 is connected to two L-shaped links 156 preferably by two wires 158 attached to either end of the rod 152. The L-shaped links 156 are pivotally attached an upper portion of the base 34. One leg of each L-shaped link 156 is configured to extend through slots 160 forked in the upper part of the base 34 when the shaped links 156 are pivoted.

Figure 11B:
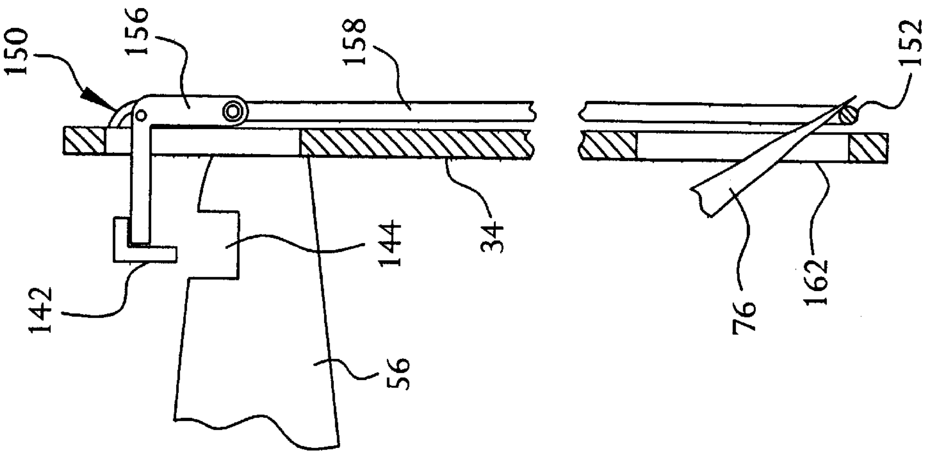
FIG. 11A–11B are cross-sectional views of a disengagement mechanism for use in disengaging the door latch.
Figure 11A:
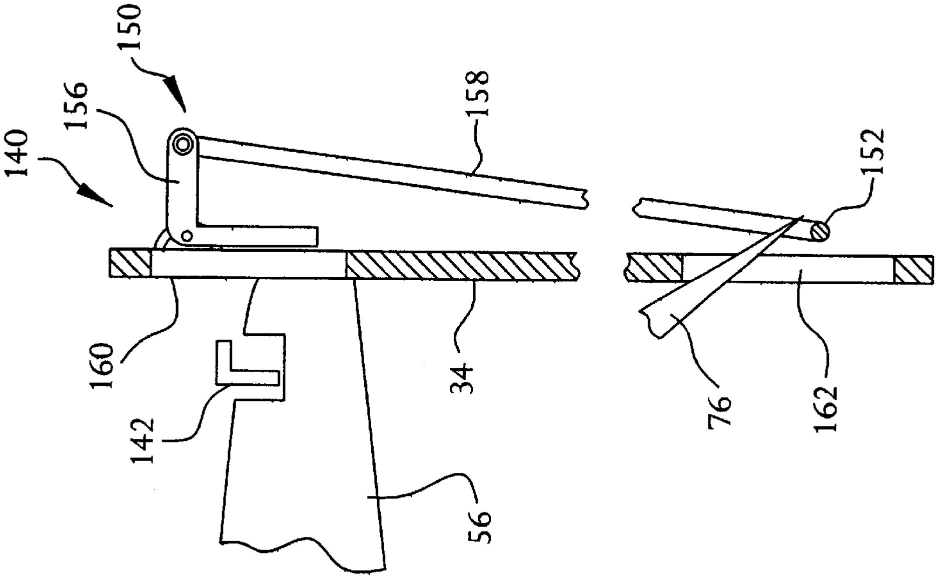

The operation of the door locking assembly 140 will now be discussed. After the last article has been removed from the elevator 32, the fingers 76 slide into the slots 162 behind the rod 152 as shown in FIGS. 4C and 11A. The next actuation of the dispensing assembly 38 causes the finger 76 to slide the rod 152 downward within the cage 154. The rod, in turn, pulls the wires 158 which cause the L-shaped link 156 to pivot. As the arm on the L-shaped pivot passes through the slot 160, it contacts the door lock pivot arm 142, causing it to pivot up and out 95 of the detent 144 in the door latch 56 (schematically shown in FIG. 11B). At this point, the door latch 56 is unlocked.

When the door latch 56 is unlocked, compression springs located between the front door and the front wall 18 of the housing 14 cause the front door 12 to open a small amount (e.g., approximately 2 inches). The purchaser can then open the front door fully and pull out the last article contained within the display case 50. The spring force of the torsion springs 16 will cause the front door 12 to close fully and the door locking assembly to re-engage with the door lock pivot arm 142, once again locking the front door 12.

Referring now to FIG. 2, in order to load the elevator 32, the operator pushes the base 34 toward the back wall 20 compressing the springs 40. The operator then engages an elevator lock to hold the base 34 near the back wall 20 until the loading process is complete. One embodiment of the elevator lock 200 is shown in FIG. 8A. The elevator lock 200 includes a bracket 202 mounted to an inner wall of the housing 14 adjacent to the elevator. The elevator lock 200 also includes an L-shaped pivot arm 204 with the shorter segment of the L-shaped arm being pivotally attached to the bracket 202. Rotation of the pivot arm 204 is limited by a stopping surface 206 which contacts the bracket 202 after the pivot arm 204 is rotated through a small arc. The stopping surface 206 is positioned so as to permit the longer segment of the L-shaped pivot arm 204 to protrude slightly beyond the bracket 202 and, thereby, prevent the base 34 from sliding past the bracket 202.

Figure 8B:
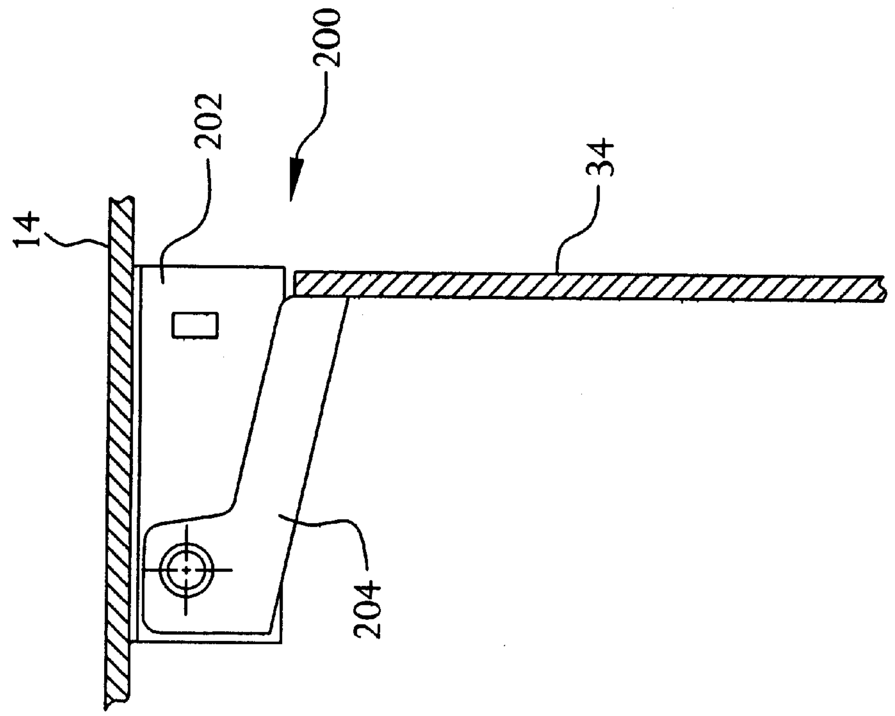
FIGS. 8A–8B illustrate the operation of an elevator lock for use when loading the elevator with articles to be dispensed.
Figure 8A:
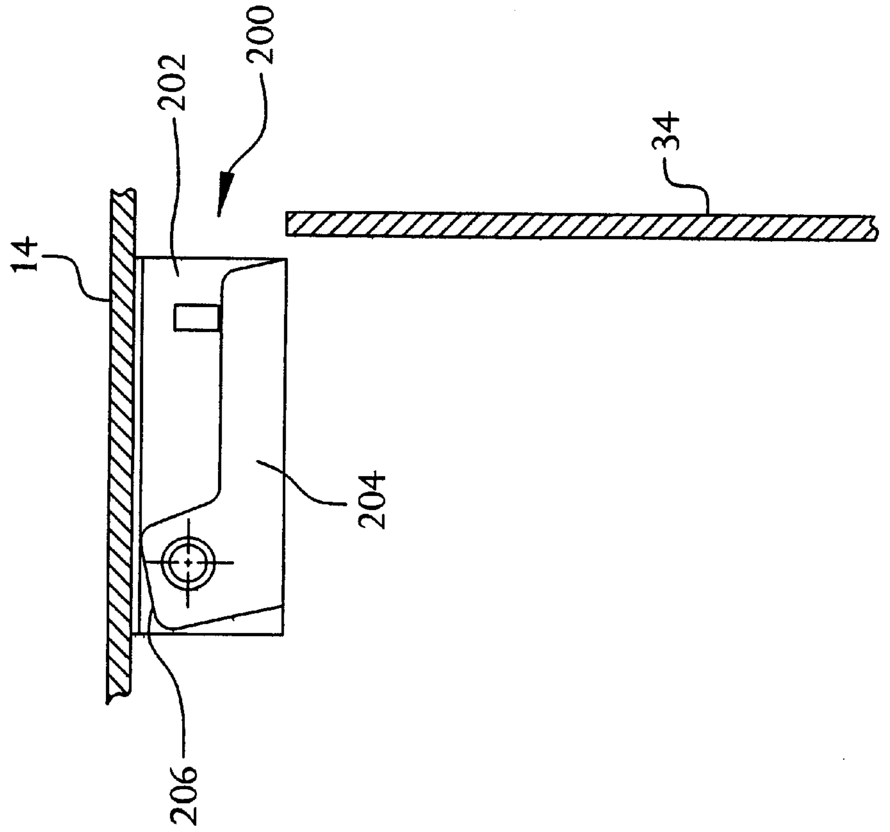

In use, the operator retracts the base 34 and rotates the pivot arm 204 until it protrudes past the bracket 202 as shown in FIG. 8B. The operator then loads the elevator 32.

Once the elevator 32 is loaded, the operator counter-rotates the pivot arm 204 thereby releasing the base 34.

Figure 13:
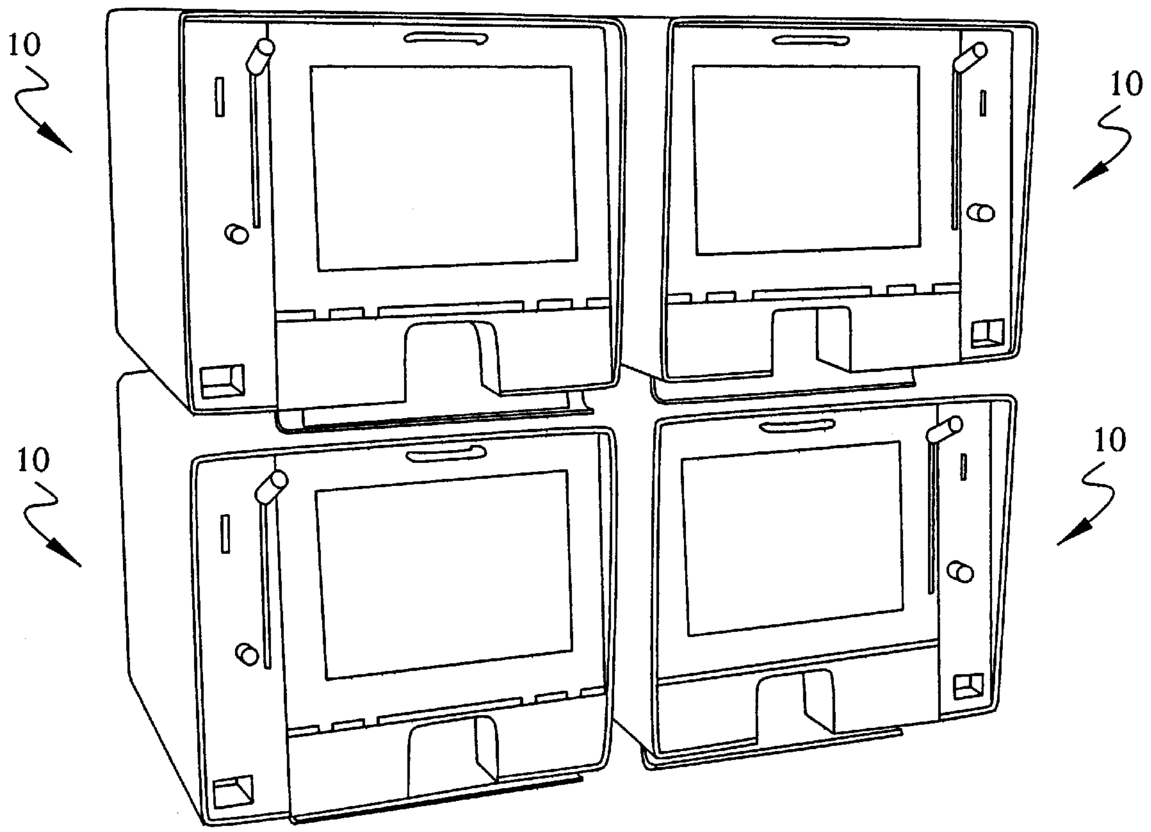
FIG. 13 is an alternate embodiment of the invention illustrating several vending machines mounted together.

It is contemplated that multiple units of the vending machine described above can be stacked and/or arranged on a common base as shown in FIG. 13

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

What is claimed is:

1. A vending machine for dispensing a single publication product, the vending machine comprising:

a housing with a front wall, back wall, side walls, top wall and bottom wall;

a door hinged to the front wall on the housing, the door being part of a display case for displaying a copy of the product being dispensed;

an elevator located within the housing and slidable from a position near the back wall toward the front wall, the elevator adapted to contain a stack of products being dispensed;

a dispensing assembly mounted within housing forward of the elevator, the dispensing assembly including a dispensing sled translatable from an upper position to a lower position within the housing, the dispensing sled adapted to engage a publication product located on the elevator and to slide the publication product to a dispensing area located at a lower portion of the housing;

an actuation arm attached to the dispensing sled and pivotally mounted to the housing, the actuation arm projecting outward from the front of the housing and actuatable from a first position to a second position, the actuation of the actuation arm adapted to translate the dispensing sled downward;

a locking mechanism for preventing dispensing of a publication product; and a door locking assembly preventing access to the product in the display case until after the last product on the elevator has been dispensed.

2. A vending machine according to claim 1 wherein the door locking assembly includes:

at least one door latch mounted to the door;

a pivot arm mounted to the housing and pivotal about a point, the pivot arm being biased into locking engagement with the door latch; and a disengagement mechanism mounted to the elevator, the disengagement mechanism including a link that is adapted to pivot the pivot arm out of locking engagement with the door latch when the actuation arm is actuated and there are no products on the elevator.

3. A vending machine according to claim 2 wherein the link is an L-shaped link pivotally mounted to a base on the elevator, and wherein the disengagement mechanism further includes a rod located on the rear of the base and connected to the link, the base having slots formed in it adjacent to the rod, and wherein actuation of the actuation arm with no products on the elevator causes the dispensing sled to engage the rod thereby pivoting the L-shaped link.

4. A vending machine according to claim 1 further comprising at least one compression spring located between the door and the housing and adapted to bias the door away from the housing when the door latch assembly is unlocked.

5. A vending machine according to claim 1 wherein the display case includes a back wall fixedly attached to the housing, the back wall including graphical indicia for indicating when no publications are remaining in the machine.

6. A vending machine according to claim 1 wherein the elevator includes a base slidably disposed on at least one guide, the guide extending from the rear of the machine toward the dispensing assembly, and at least one spring located between the base and the back wall of the housing, the spring adapted to bias the base toward the dispensing assembly.

7. A vending machine according to claim 1 further comprising an elevator lock located adjacent to the elevator near the back wall, the elevator lock including a bracket mounted to the housing adjacent to the elevator, and an L-shaped pivot arm pivotally attached to the bracket, one leg of the L-shaped pivot arm adapted when pivoted to protrude into the path of travel of the base to prevent a base of the elevator from sliding toward the dispensing assembly.

8. A vending machine for dispensing a single publication product, the vending machine comprising:

a housing with a front wall, back wall, side walls, top wall and bottom wall;

a door hinged to the front wall on the housing, the door being part of a display case for displaying information regarding the product being dispensed;

an elevator located within the housing and slidable from a position near the back wall toward the front wall, the elevator adapted to contain a stack of products being dispensed;

a dispensing assembly mounted within housing forward of the elevator, the dispensing assembly including a dispensing sled translatable from an upper position to a lower position within the housing, the dispensing sled being mounted on rails and reciprocatably attached to a fixed support in the dispensing assembly and being adapted to engage a publication product located on the elevator and to slide the publication product to a dispensing area located at a lower portion of the housing;

an actuation arm attached to the dispensing sled and pivotally mounted to the housing, the actuation arm projecting outward from the front of the housing and actuatable from a first position to a second position, the actuation of the actuation arm adapted to translate the dispensing sled downward; and a locking mechanism for preventing dispensing of a publication product.

9. A vending machine according to claim 8 wherein the dispensing sled includes contact fingers pivotally mounted on the sled, the fingers adapted to contact and urge the top product on the elevator toward the dispensing area.

10. A vending machine according to claim 9 wherein the fingers are biased toward the elevator.

11. A vending machine for dispensing a single publication product, the vending machine comprising:

a housing with a front wall, back wall, side walls, top wall and bottom wall;

a door hinged to the front wall on the housing, the door being part of a display case for displaying a copy of the product being dispensed;

an elevator located within the housing and slidable from a position near the back wall toward the front wall, the elevator adapted to contain a stack of products being dispensed;

a dispensing assembly mounted within housing forward of the elevator, the dispensing assembly including a dispensing sled translatable from an upper position to a lower position within the housing, the dispensing sled adapted to engage a publication product located on the elevator and to slide the publication product to a dispensing area located at a lower portion of the housing;

an actuation arm attached to the dispensing sled and pivotally mounted to the housing, the actuation arm projecting outward from the front of the housing and actuatable from a first position to a second position, the actuation of the actuation arm adapted to translate the dispensing sled downward; and a locking mechanism for preventing dispensing of a publication product, the locking mechanism including a locking latch pivotally attached to a latch bracket, the latch bracket being pivotally mounted to the housing, the locking latch adapted to engage with a locking bracket mounted within the housing, and a coin mechanism mounted adjacent to the locking bracket and adapted to control disengagement of the locking latch from the locking bracket upon receipt of a predetermined amount of currency.

12. A vending machine according to claim 11 further comprising a cam lock pivotally mounted to the locking bracket below the coin mechanism, the cam lock including a locking seat which is adapted to engage with a plunger in the coin mechanism, and a cam surface adapted to contact the locking latch when the locking latch is disengaged from the locking bracket.

13. A vending machine for dispensing a single publication product, the vending machine comprising:

a housing with a front wall, back wall, side walls, top wall and bottom wall;

a door hinged to the front wall on the housing, the door including a transparent window which forms part of a display case for displaying a copy of the product being dispensed;

an elevator located within the housing and adapted to contain a stack of products being dispensed, the elevator including a base mounted on guides and translatable from a position near the back wall toward the front wall, the base being biased toward the front wall;

a dispensing assembly mounted within housing forward of the elevator, the dispensing assembly including a dispensing sled, the dispensing sled being translatable from an upper position to a lower position within the housing, the dispensing assembly being located, the dispensing sled adapted to engage a publication product located on the elevator and to slide the publication product to a dispensing area near the bottom of the housing;

a door locking assembly which prevents access to the product in the display case until after the last product on the elevator has been dispensed;

an actuation arm attached to the dispensing sled and pivotally mounted to the housing, the actuation arm projecting outward from the front of the housing and actuatable in a downward direction, the downward actuation of the actuation arm adapted to translate the dispensing sled downward; and a locking mechanism including a coin mechanism adapted to receive currency, the locking mechanism adapted to prevent pivotal motion of the actuation arm until a predetermined amount of currency is supplied to the coin mechanism.

14. A vending machine according to claim 13 wherein the door locking assembly includes:

at least one door latch mounted to the door, pivot arm mounted to the housing and pivotal about a point, the pivot arm being biased into locking engagement with the door latch, and a disengagement mechanism mounted to the elevator the disengagement mechanism including a link that is adapted to pivot the pivot arm out of locking engagement with the door latch when the dispensing sled is translated and there are no products on the elevator.

15. A vending machine according to claim 14 wherein the link is an L-shaped link pivotally mounted to a base on the elevator, and wherein the disengagement mechanism further includes a rod located on the rear of the base and connected to the link, the base having slots formed in it adjacent to the rod, and wherein translation of the dispensing sled with no products on the elevator causes the dispensing sled to contact the rod and thereby pivot the L-shaped link.

16. A vending machine according to claim 13 further comprising at least one compression spring located between the door and the housing and adapted to bias the door away from the housing when the door latch assembly is unlocked.

17. A vending machine according to claim 13 wherein the display case includes a back wall fixedly attached to the housing, the back wall including graphical indicia for indicating when no publications are remaining in the machine.

18. A vending machine according to claim 13 wherein the dispensing assembly is located between the base and the front wall, and wherein the guides extend from the rear of the machine toward the dispensing assembly, at least one spring is located between the base and the back wall of the housing, the spring adapted to bias the base toward the dispensing assembly.

19. A vending machine according to claim 13 wherein the dispensing sled is mounted on rails and reciprocatably attached to a fixed support in the dispensing assembly.

20. A vending machine according to claim 19 wherein the dispensing sled includes contact fingers pivotally mounted on the sled, the fingers adapted to contact and urge the top product on the elevator toward the dispensing area.

21. A vending machine according to claim 20 wherein the fingers are biased toward the elevator.

22. A vending machine according to claim 13 further comprising an elevator lock located adjacent to the elevator near the back wall, the elevator lock including a bracket mounted to the housing adjacent to the elevator, and an L-shaped pivot arm pivotally attached to the bracket, one leg of the L-shaped pivot arm adapted when pivoted to protrude into the path of travel of the base to prevent the base from sliding toward the dispensing assembly.

23. A vending machine according to claim 13 wherein the locking mechanism includes a locking latch pivotally attached to a latch bracket, the latch bracket being pivotally mounted to the housing, a locking bracket mounted within the housing adjacent to the coin mechanism, the locking latch adapted to engage the locking bracket when the actuation arm is in its non-actuated position, the coin mechanism adapted to control disengagement of the locking latch from the locking bracket upon receipt of a predetermined amount of currency.

24. A vending machine according to claim 23 further compromising a cam lock pivotally mounted to the locking bracket below the coin mechanism, the cam lock including a locking seat which is adapted to engage with a retractable plunger in the coin mechanism, and a cam surface adapted to contact the locking latch when the plunger is retracted from the locking seat thereby permitting the disengagement of the locking latch from the locking bracket.

25. A vending machine for dispensing a single publication product, the vending machine comprising:

a housing with a front wall, back wall, side walls, top wall and bottom wall;

a door hinged to the front wall on the housing, the door including a transparent window which forms part of a display case for displaying a copy of the product being dispensed;

an elevator located within the housing and adapted to contain a stack of products being dispensed, the elevator including a base mounted on guides and translatable from a position near the back wall toward the front wall, the base being biased toward the front wall;

a dispensing assembly mounted within housing forward of the elevator, the dispensing assembly including a dispensing sled, the dispensing sled being translatable from an upper position to a lower position within the housing, the dispensing assembly being located, the dispensing sled adapted to engage a publication product located on the elevator and to slide the publication product to a dispensing area near the bottom of the housing;

an actuation arm attached to the dispensing sled and pivotally mounted to the housing, the actuation arm projecting outward from the front of the housing and actuatable in a downward direction, the downward actuation of the actuation arm adapted to translate the dispensing sled downward; and a locking mechanism including a coin mechanism adapted to receive currency, the locking mechanism adapted to prevent pivotal motion of the actuation arm until a predetermined amount of currency is supplied to the coin mechanism;

the vending machine being part of an assembly including at least two vending machines stacked on a common base such that the dispensing areas of the machines face in the same direction and wherein the dispensing areas do not interfere with the stacking of the machines.

26. A vending machine for dispensing a single publication product, the vending machine comprising:

a housing with a front wall, back wall, side walls, top wall and bottom wall;

an elevator located within the housing and adapted to contain a stack of products being dispensed, the elevator including a base which is slidable alone guides from a position near the back wall toward the front wall, the base being biased toward the front wall;

a dispensing assemblyn mounted within housing forward of the elevator, the dispensing assembly including a dispensing sled, the dispensing sled being translatable from an upper position to a lower position in the housing, the dispensing sled adapted to engage a publication product located on the elevator and to slide the publication product to a dispensing area located in a lower portion of the housing;

actuation arm attached to the dispensing sled and pivotally mounted to the housing, the actuation arm projecting outward from the front of the housing and actuatable from a first position to a second position, the actuation of the actuation arm adapted to translate the dispensing sled downward;

a door hinged to the front wall on the housing, the door including a transparent window which forms part of a display case for displaying a copy of the product being dispensed, and a door locking assembly for locking the door to the front wall, the door locking assembly including at least one door latch mounted to the door, a pivot arm mounted to the housing and pivotal about a point, the pivot arm being biased into locking engagement with the door latch, and a disengagement mechanism mounted to the elevator, the disengagement mechanism including a link adapted to pivot the pivot arm out of locking engagement with the door latch when the dispensing sled is translated and there are no products on the elevator; and a locking mechanism including a coin mechanism adapted to receive currency the locking mechanism adapted to prevent translation of the dispensing sled until a predetermined amount of currency is supplied to the coin mechanism the locking mechanism including a locking latch pivotally attached to a latch bracket, the locking bracket being pivotally mounted to the housing the locking latch adapted to engage with a locking bracket mounted within the housing the coin mechanism being mounted adjacent to the locking bracket and adapted to control disengagement of the locking latch from the locking bracket.

27. A vending machine for dispensing a single publication product, the vending machine comprising:

a housing with a front wall, back wall, side walls, top wall and bottom wall;

a door hinged to the front wall on the housing, the door being part of a display case for displaying information regarding the product being dispensed;

an elevator located within the housing and slidable from a position near the back wall toward the front wall, the elevator adapted to contain a stack of products being dispensed;

a dispensing assembly mounted within the housing forward of the elevator, the dispensing assembly including a dispensing sled translatable from an upper position to a lower position within the housing, the dispensing sled having downwardly disposed fingers biased toward the elevator to engage a publication product located on the elevator and to slide the publication product in only a downward direction to a dispensing area located at a lower portion of the housing;

an actuation arm attached to the dispensing sled and pivotally mounted to the housing, the actuation arm projecting outward from the front of the housing and actuatable from a first position to a second position, the actuation of the actuation arm adapted to translate the dispensing sled downward; and a locking mechanism for preventing dispensing of a publication product.

28. A vending machine according to claim 27 further comprising:

an adjustment mechanism for adjusting the width of the dispensing area.

* * * * *